Oct. 1, 1935.  J. S. SHARPE  2,016,182
TRANSMISSION
Filed April 28, 1934  3 Sheets-Sheet 2

Inventor:
John S. Sharpe
by his Attorneys
Howson & Howson

Oct. 1, 1935.  J. S. SHARPE  2,016,182
TRANSMISSION
Filed April 28, 1934   3 Sheets-Sheet 3

Patented Oct. 1, 1935

2,016,182

UNITED STATES PATENT OFFICE 2,016,182

TRANSMISSION

John S. Sharpe, Haverford, Pa.

Application April 28, 1934, Serial No. 722,993

14 Claims. (Cl. 74—262)

This invention relates to improvements in selective multi-speed forward and reverse transmissions of a character adaptable for use in motor vehicles, and the object of the invention is to provide a novel transmission of this type that shall be simple and compact in form, inexpensive to manufacture and quiet in operation.

Figure 1:
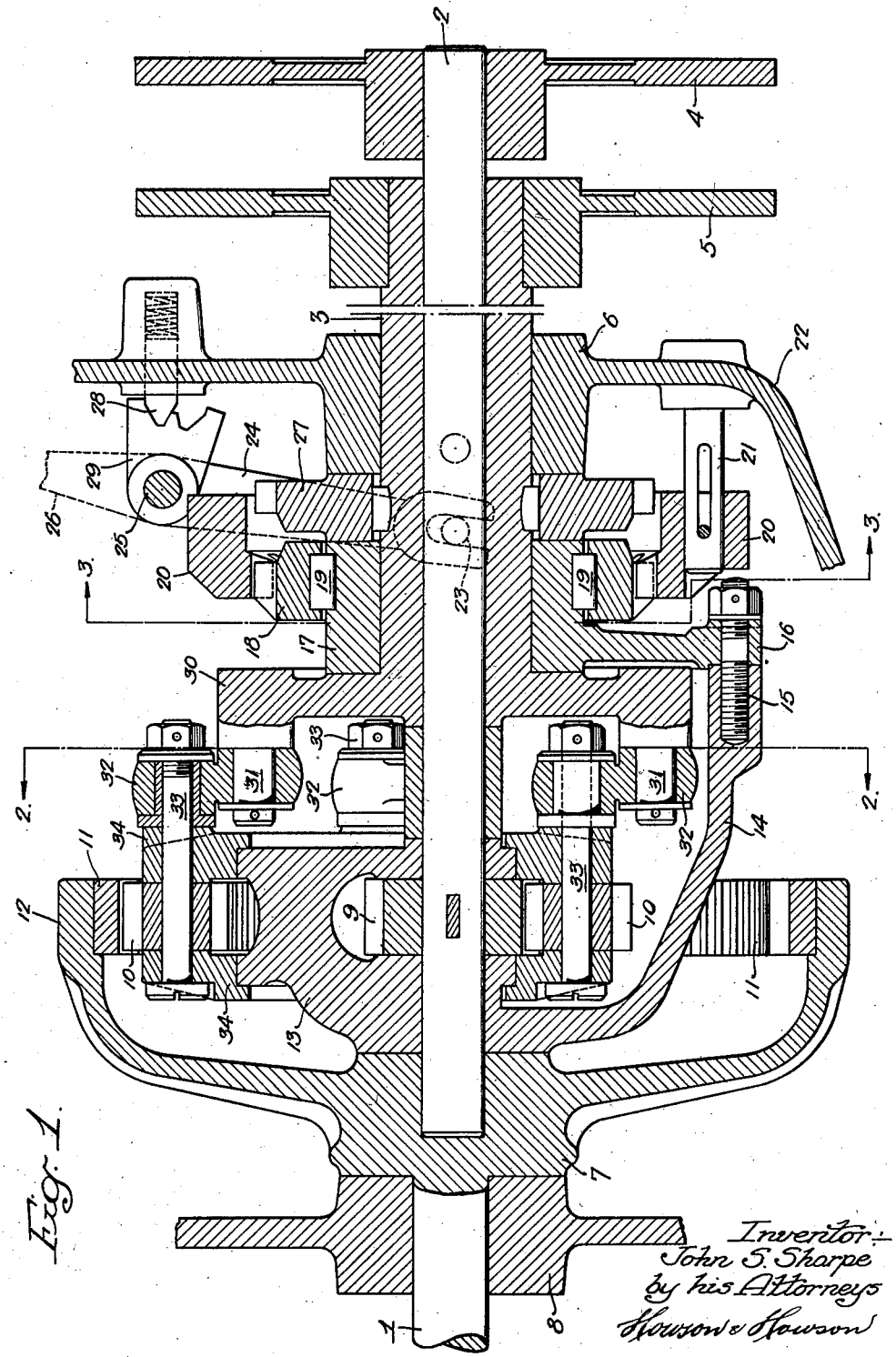
Figure 1 is a longitudinal sectional view of a transmission mechanism made in accordance with my invention.
Figure 2:
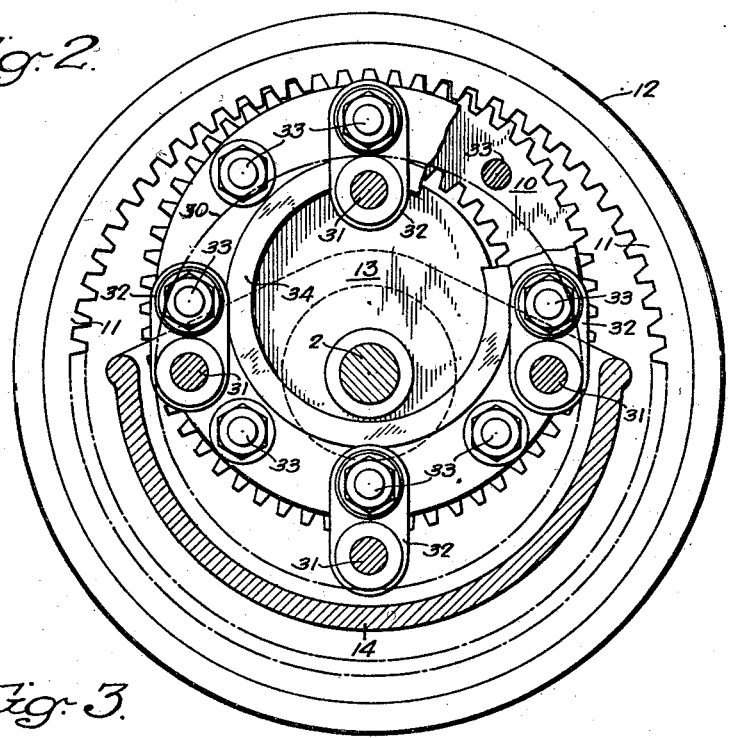
Fig. 2 is a section on the line 2—2, Fig. 1.

With reference to the drawings, the mechanism in the illustrated embodiment comprises terminal shaft elements 1, 2 and 3. The shaft 3 is hollow and embraces the shaft 2, and the terminal end of each of these shafts is provided with a clutch element designated respectively 4 and 5. Adjacent its inner end a suitable bearing 6 is provided for the shaft 3, and the latter constitutes a bearing for the shaft 2, the inner end of which is also journaled in the inner enlarged end 7 of the shaft 1. This latter shaft is journaled in the present instance in a bearing 8.

Figure 3:
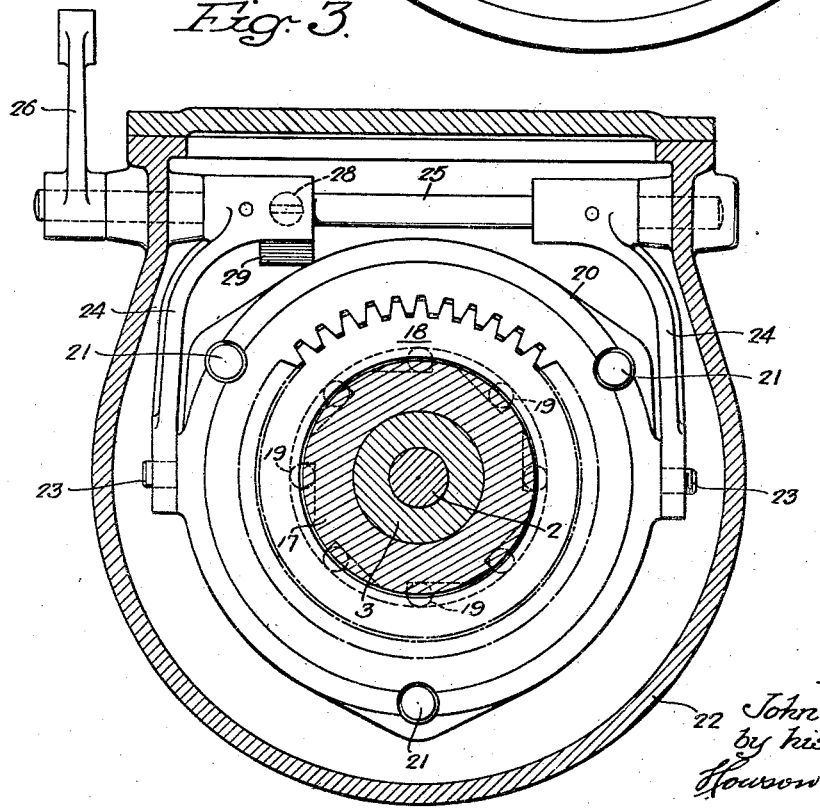
Fig. 3 is a section on the line 3—3, Fig. 1.

Fixed to the shaft 2 adjacent its inner end is a pinion 9 which meshes internally with a composite gear 10, which in the present instance takes the form of a simple annulus provided both internally and externally with gear teeth. Externally the gear 10 meshes with an internal gear 11 secured to a flange 12 extending from the enlarged inner end portion 7 of the shaft 1. The composite gear 10 is journaled eccentrically to the shaft 2 upon a rotary carrier 13, which carrier is journaled on the last-named shaft; and the carrier 13 has a transverse segmental arm or projection 14 which is secured by stud bolts 15 to an arm 16 projecting radially from a sleeve 17 journaled on the shaft 3. A toothed collar 18 embraces the sleeve 17 and is operatively associated with the sleeve 17 through the medium of an overrunning clutch 19. The collar 18 constitutes in itself one element of a dog clutch, the other element 20 of which, in the form of an internally toothed annulus, is slidably supported upon pins 21 mounted in the relatively fixed casing 22. The annulus 20 is provided at its opposite sides with trunnions 23, and these trunnions are respectively engaged in slots at the lower extremities of arms 24, 24 secured to and depending from a rock shaft 25 suitably journaled in the casing and carrying on its projecting end an operating lever 26, see Fig. 3. Through the medium of this lever 26 and the associated elements, the clutch annulus 20 may be shifted axially between alternative positions in which it respectively engages the collar 18, as illustrated in Fig. 1, and a third clutch element 27 keyed to the shaft 3. Suitable means such as a spring-pressed detent 28 and notched segment 29 is provided for releasably retaining the shaft 25 in its alternative positions of adjustment in which as previously set forth the clutch element 20 engages either the collar 18 or the element 27. It will be apparent that one of the elements 18 or 27 engaged by the element 20 is immobilized and held against rotation.

The shaft 3 has at its inner end a flange 30, from the inner end of which projects a series of wrist pins 31. Operatively associated with each of the pins 31 is a crank 32, and each of the cranks is connected with a pin 33 on the composite gear 10. In the present instance, the pins 33 are integral projecting portions of the bolts which secure the journal flanges 34, 34 to the opposite faces of the composite gear.

Figure 4:
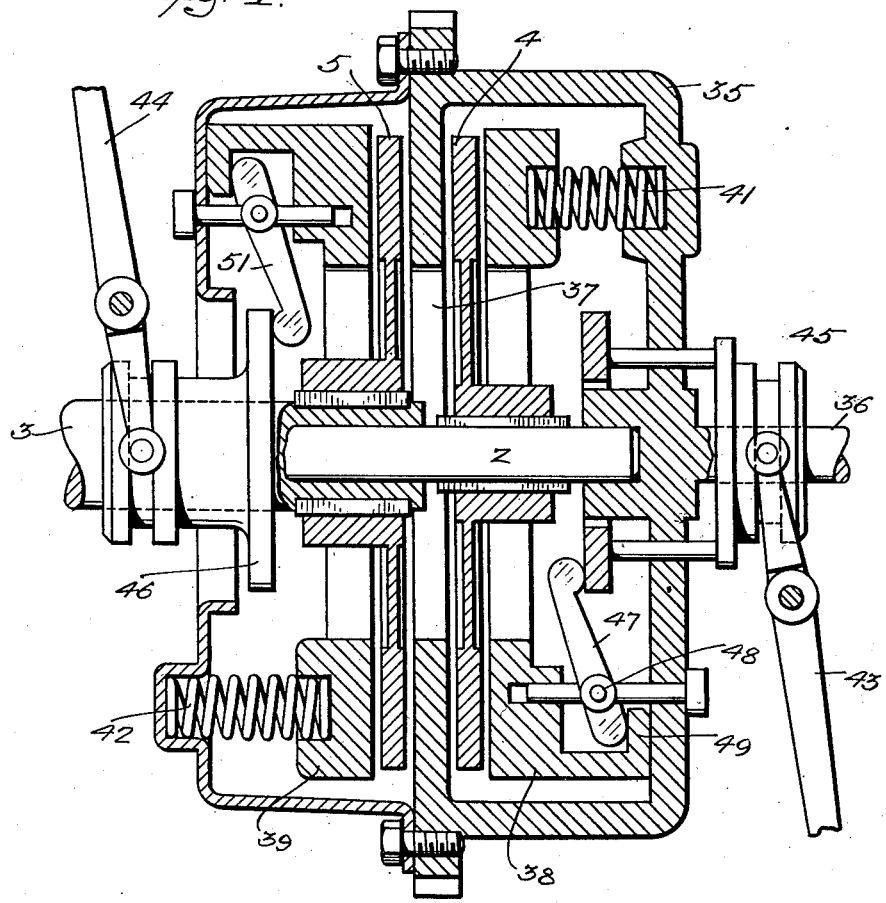
Fig. 4 is a sectional view illustrating a form of clutch mechanism suitable for use in the practice of my invention.

In the normal operation of the aforedescribed mechanism, the clutch elements 4 and 5 constitute a means for individually or simultaneously operatively connecting the shafts 2 and 3 to a source of motive power. Clutch mechanism suitable for this purpose is illustrated in Fig. 4, wherein the disks 4 and 5 are shown embraced by a casing 35 which is secured to a shaft 36 connected to the source of power (not shown). The casing 35 has a radial flange 37 which lies intermediate and is adapted for frictional engagement with the inner faces of the disks 4 and 5. Adjustably mounted in the casing adjoining the outer faces of the disks 4 and 5 respectively are annular elements 38 and 39, and springs 41 and 42 confined between these elements and the walls of the casing 35 tend to force the elements against the disks 4 and 5, to thereby force the disks against the face of the casing flange 37 and to frictionally grip the disks so that the latter are caused to rotate with the casing. It will be noted that the disks 4 and 5 are, in effect, splined to the shafts 2 and 3 respectively, and when the disks 4 and 5 are immobilized with the casing as described, the said shafts 2 and 3 are caused to rotate with the drive shaft 36. The elements 38 and 39 may be individually and independently retracted to release the disks 4 and 5 by means of levers 43 and 44, which respectively operatively engage members 45 and 46. The member 45 is slidably supported on the shaft 36 and in the casing 35, and its inner end is adapted to engage one end of a lever 47 which is pivoted at 48 in the casing and the other end of which engages a flange 49 of the element 38. The lever 43 is actuated to advance the member 45 toward the casing. It will be apparent that the element 38 will be retracted against the pressure of the springs 41 toward the position in which it is shown in the drawings, thereby freeing the disk 4. The member 46 is similarly slidably supported upon the shaft 3, and is operatively connected in like manner through a pivoted lever 51 with the element 39. By manipulation of the levers 43 and 44, it is apparent that the disks 4 and 5 may be either individually or jointly immobilized with respect to the casing 35 or may both be released from the casing, as shown in the drawings. When the clutch element 4 is engaged to the exclusion of the element 5, and with the clutch element 20 engaging the collar 18 as shown in Fig. 1, the resulting rotation of the shaft 2 and of the pinion 9 will tend to rotate the composite gear 10 in the same direction upon its eccentric journal 13. This rotation upon the journal 13 is resisted by the load applied to the shaft 1, so that there is a resulting tendency to cause the eccentric journal member 13 to rotate about the shaft 2 in the opposite direction. Such rotation of the member 13 is prevented by action of the overrunning clutch 19, so that the entire rotative force applied to the composite gear 10 is transferred to the internal gear 11 and to the shaft 1. Assuming that this rotative force is sufficient to move the load applied to the shaft 1, the latter will be rotated in the same direction as the shaft 2 but at a relatively low rate of speed. If now the clutch element 4 is disengaged and the clutch element 5 engaged, power will be applied through the shaft 3 to the cranks 32, and through the cranks to the composite gear 10, so that the latter gear will tend to rotate upon its eccentric journal in the same direction as the shaft 3. This rotation of the gear 10 is resisted by the load on the shaft 1, so that there is a reaction tending to rotate the eccentric bearing member 13 in the opposite direction. Rotation of the bearing member in this direction, as previously set forth, is prevented by the overrunning clutch 19, so that the entire rotative force applied to the composite gear 10 is applied through the internal gear 11 to the shaft 1. Again assuming that this force is sufficient to move the load, the shaft 1 will be rotated in the same direction as the shaft 3 but at a lower rate of speed. The speed ratio between the shaft 3 and the shaft 1 under these conditions is lower than the ratio that previously existed between the shaft 2 and the shaft 1.

Assuming now that the clutch elements 4 and 5 are engaged simultaneously and the shafts 2 and 3 are thereby jointly connected to the source of power, it will be apparent that the entire mechanism, including the internal gear 11, the composite gear 10, the pinion 9, and the eccentric journal member 13, and also the cranks 32, will be locked and will rotate as a unit, thereby affording a direct drive connection from the source of power to the shaft 1.

If a reversal of the direction of rotation of the shaft 1 is desired, the clutch element 20 through the medium of the lever 26 is shifted from engagement with the collar 18 into engagement with the element 27. The clutch element 5 being disengaged, engagement of the clutch element 4 will effect a rotation of the pinion 9 tending to rotate the composite gear 10 in the same direction upon its eccentric journal. Such rotation of the gear 10 is now prevented by reason of the fact that the shaft 3 is immobilized through the clutch 20—27. The resultant reaction of the rotative force applied to the composite gear 10 through the pinion 9 effects a reverse rotation of the eccentric journal member 13 and the cranks 32, permitting the composite gear 10 to revolve without rotation in the same direction. This revolution of the gear 10 effects a rotation of the internal gear 11, and hence of the shaft 1, in the same direction, the speed of the shaft being at a reduced rate with respect to the rotational speed of the shaft 2.

The aforedescribed mechanism affording a selective three-speed forward rotation of the shaft 1 and a reverse rotation is characterized by relative simplicity of form and low cost of manufacture; and by reason of the internal relation of the gear train consisting of the pinion 9, composite gear 10 and the internal gear 11 possesses to a maximum degree the characteristics of quietness of operation, strength and durability.

I claim:

1. In power transmission mechanism, the combination with an eccentric rotary carrier, of a composite gear journaled concentrically on the carrier, means for controlling rotation of the carrier, a plurality of driving elements, means for individually connecting said driving elements with said composite gear, and selective operating means for said elements.

2. In transmission mechanism, the combination with an eccentric rotary carrier, of a composite gear journaled concentrically on the carrier, means for controlling rotation of the carrier, a rotary element constituting a terminal element at one end of the transmission, means for operatively connecting said element with the composite gear, a plurality of rotary elements constituting selective terminal elements at the other end of the transmission, and means for individually operatively connecting said last-named elements to said composite gear.

3. In transmission mechanism, the combination with an eccentric rotary carrier, of a composite gear journaled concentrically on the carrier, means for controlling rotation of the carrier, an internal gear concentric with the axis of said carrier and meshing with the composite gear, a plurality of shafts coaxial with said internal gear, and means for independently operatively connecting said shafts with the composite gear.

4. In transmission mechanism, the combination with an eccentric rotary carrier, of a composite gear journaled concentrically on the carrier, means for controlling rotation of the carrier, an internal gear concentric with the axis of said carrier and meshing with the composite gear, a pinion coaxial with said internal gear and meshing internally with said composite gear, a rotary transmission member coaxial with said pinion, and means independent of said pinion for operatively connecting said member with the composite gear.

5. In transmission mechanism, the combination with an eccentric rotary carrier, of a composite gear journaled concentrically on the carrier, means for controlling rotation of the carrier, an internal gear concentric with the axis of said carrier and meshing with the composite gear, a pinion coaxial with said internal gear and meshing internally with said composite gear, a rotary transmission member coaxial with said pinion, and crank means for operatively connecting said member with the composite gear.

6. In transmission mechanism, the combination with an eccentric rotary carrier, of a composite gear journaled concentrically on the carrier, a rotary element constituting a terminal element at one end of the transmission, means for operatively connecting said element with the composite gear, a plurality of rotary elements constituting selective terminal elements at the other end of the transmission, means for individually operatively connecting said last-named elements with the composite gear, and means for selectively controlling rotation of said carrier and of one of the last-named terminal elements.

7. In transmission mechanism, the combination with an eccentric rotary carrier, of a composite gear journaled concentrically on the carrier, a rotary element constituting a terminal element at one end of the transmission, means for operatively connecting said element with the composite gear, a plurality of rotary elements constituting selective terminal elements at the other end of the transmission, means for individually operatively connecting said last-named elements with the composite gear, and means for selectively immobilizing the said carrier and one of the last-named terminal elements against rotation in at least one direction.

8. In transmission mechanism, the combination with an eccentric rotary carrier and means for controlling rotation of said carrier, of a composite gear journaled concentrically on the carrier, a rotary driven member coaxial with the carrier and comprising an internal gear meshing with said composite gear, a pair of drive shafts coaxial with the driven shaft, a pinion on one of said drive shafts meshing internally with said composite gear, and means for operatively connecting the other of said drive shafts with the composite gear.

9. In transmission mechanism, the combination with an eccentric rotary carrier and means for controlling rotation of said carrier, of a composite gear journaled concentrically on the carrier, a rotary driven member coaxial with the carrier and comprising an internal gear meshing with said composite gear, a pair of drive shafts coaxial with the driven shaft, a pinion on one of said drive shafts meshing internally with said composite gear, and means for operatively connecting the other of said drive shafts with the composite gear, said connecting means comprising a plurality of cranks.

10. In transmission mechanism, the combination with an eccentric rotary carrier and means for controlling rotation of said carrier, of a composite gear concentrically journaled on said carrier, a driven member coaxial with said carrier and comprising an internal gear meshing with said composite gear, a pair of drive shafts coaxial with the driven member, a pinion carried by one of said drive shafts and meshing internally with said composite gear, means for operatively connecting the other of said drive shafts with the composite gear, and means for immobilizing said second drive shaft.

11. In transmission mechanism, the combination with an eccentric rotary carrier, of a composite gear journaled concentrically on said carrier, a driven member coaxial with said carrier and comprising an internal gear meshing with said composite gear, a drive shaft coaxial with the driven member and having a pinion meshing internally with said composite gear, a second drive shaft coaxial with the driven member, means for operatively connecting said second drive shaft with the composite gear, and means for selectively immobilizing said carrier and said second drive shaft.

12. In transmission mechanism, the combination with an eccentric rotary carrier, of a composite gear journaled concentrically on said carrier, means for controlling rotation of said carrier, a driven member coaxial with the carrier and comprising an internal gear meshing with said composite gear, a plurality of drive shafts, means for individually operatively connecting said drive shafts with said composite gear, and selective means for individually and collectively connecting said drive shafts with a source of power.

13. In transmission mechanism, the combination with an eccentric rotary carrier, of a composite gear journaled concentrically on said carrier, means for controlling rotation of said carrier, a driven member coaxial with the carrier and comprising an internal gear meshing with said composite gear, a plurality of drive shafts, means for individually operatively connecting said drive shafts with said composite gear, selective means for individually and collectively connecting said drive shafts with a source of power, and means for immobilizing one of said drive shafts.

14. In transmission mechanism, the combination with an eccentric rotary carrier, of a composite gear journaled concentrically on said carrier, a driven member coaxial with the carrier and comprising an internal gear meshing with said composite gear, a drive shaft coaxial with the driven member and having a pinion meshing internally with said composite gear, a second drive shaft coaxial with the first, a plurality of cranks operatively connecting said second drive shaft with the composite gear, an overrunning clutch for immobilizing the carrier against rotation in one direction, means for rendering said overrunning clutch inoperative with respect to the carrier, and releasable means for immobilizing said second drive shaft.

JOHN S. SHARPE.